(12) United States Patent
Devaux et al.

(10) Patent No.: US 10,875,667 B2
(45) Date of Patent: Dec. 29, 2020

(54) SECURE TERMINAL

(71) Applicant: EMBASSAIR GROUP INTERNATIONAL, Steinset (LU)

(72) Inventors: Franklin Devaux, Prenois (FR); Eric Petit, Saint Maur des Fosses (FR)

(73) Assignee: EMBASSAIR GROUP INTERNATIONAL, Steinsel (LU)

(*) Notice: Subject to any disclaimer, the term of this patent is extended or adjusted under 35 U.S.C. 154(b) by 0 days.

(21) Appl. No.: 16/469,341

(22) PCT Filed: Dec. 16, 2016

(86) PCT No.: PCT/IB2016/057718
§ 371 (c)(1),
(2) Date: Jun. 13, 2019

(87) PCT Pub. No.: WO2018/109532
PCT Pub. Date: Jun. 21, 2018

(65) Prior Publication Data
US 2020/0010216 A1    Jan. 9, 2020

(51) Int. Cl.
*B64F 1/31* (2006.01)
*B64F 1/22* (2006.01)
(Continued)

(52) U.S. Cl.
CPC .............. *B64F 1/31* (2013.01); *B64F 1/225* (2013.01); *B64F 1/24* (2013.01); *B64F 5/50* (2017.01)

(58) Field of Classification Search
USPC ....................................................... 244/114 R
See application file for complete search history.

(56) References Cited

U.S. PATENT DOCUMENTS 3,571,990 A * 3/1971 Rossman .................. B64F 1/00
52/30
3,730,359 A * 5/1973 Andersson ................ B64F 1/00
414/392

(Continued)

FOREIGN PATENT DOCUMENTS

EP    1 812 907 B1    11/2008
GB    567 552 A       2/1945
(Continued)

OTHER PUBLICATIONS

Translation of International Search Report and Written Opinion of the International Searching Authority dated Sep. 13, 2017 in corresponding International application No. PCT/IB2016/057718; 12 pages.

(Continued)

*Primary Examiner* — Rodney E Fuller
(74) *Attorney, Agent, or Firm* — Maier & Maier, PLLC

(57) ABSTRACT

A secure terminal for the aerial transport of passengers whose technical and operational infrastructure makes it possible to ensure the physical security of the building, of the aircraft, of the goods, of the passengers and of the flight, technical and administrative personnel and the confidentiality of the passengers and of their goods, noteworthy in that it comprises at least one building having a globally V-shaped horizontal section and comprising two branches extending from a mid-zone, constituting parking hangars for aircraft and determining between them an uncovered central zone.

6 Claims, 3 Drawing Sheets

(51) Int. Cl.
*B64F 1/24* (2006.01)
*B64F 5/50* (2017.01)

(56) References Cited

U.S. PATENT DOCUMENTS

| | | | | |
|---|---|---|---|---|
| 3,842,553 A * | 10/1974 | Billgren | ............... | E04H 3/00 52/175 |
| 4,218,034 A * | 8/1980 | Magill | ............... | B64F 1/00 244/114 R |
| 4,378,755 A * | 4/1983 | Magnusson | ............... | B64F 5/23 118/314 |
| 5,223,459 A * | 6/1993 | Odawara | ............... | E04B 1/346 454/236 |
| 6,279,855 B1 * | 8/2001 | Dorner | ............... | B64F 1/00 244/114 R |
| 6,335,688 B1 * | 1/2002 | Sweatte | ............... | G07C 9/257 340/573.1 |
| 6,724,304 B2 * | 4/2004 | Risi | ............... | E05G 5/003 340/540 |
| 6,793,178 B2 * | 9/2004 | Peterson | ............... | B64F 1/00 244/114 R |
| 2002/0145079 A1 * | 10/2002 | Burley | ............... | B64F 1/002 244/114 R |
| 2003/0122685 A1 * | 7/2003 | Tuttle | ............... | G06K 17/0022 340/8.1 |
| 2006/0038069 A1 * | 2/2006 | Cawley | ............... | B64F 1/00 244/114 R |
| 2006/0071789 A1 * | 4/2006 | Giannopoulos | ............... | G07C 9/28 340/572.1 |
| 2008/0314098 A1 * | 12/2008 | Devaux | ............... | B64F 1/00 70/262 |
| 2015/0166174 A1 * | 6/2015 | Cox | ............... | B64C 25/405 244/50 |
| 2015/0329219 A1 * | 11/2015 | Soederhuizen | ............... | E04H 6/44 244/114 R |
| 2015/0343473 A1 * | 12/2015 | Mathis | ............... | B05B 13/005 427/427.2 |
| 2015/0353207 A1 * | 12/2015 | Cox | ............... | B64F 1/225 14/71.1 |

FOREIGN PATENT DOCUMENTS

| | | |
|---|---|---|
| WO | 2006/021684 A1 | 3/2006 |
| WO | 2011/034992 A2 | 3/2011 |

OTHER PUBLICATIONS

International Preliminary Report on Patentability dated Nov. 14, 2018 in corresponding International application No. PCT/IB2016/057718; 6 pages.

Response to the first Written Opinion filed on Oct. 5, 2018 in corresponding International application No. PCT/IB2016/057718; 3 pages.

* cited by examiner

SECURE TERMINAL

TECHNICAL FIELD

The present invention relates to an airport terminal aiming to resolve the problem of passenger security in view of their boarding on board a transport means of the aircraft type.

BACKGROUND

In the field of aerial transport, terrorist activities currently represent a considerable danger and it appears essential for passenger security to succeed in forbidding access to transport means and/or instead of boarding of any unauthorised person with bad intentions.

A real demand is today emerging from users of aerial transport to increase the security level during boarding and during the transport itself, in order to avoid a possible drop in the frequentation of this type of transport, which would have considerable damaging financial repercussions on airlines.

Systems are already known, which aim to make it possible for the individual control of access to an airport; this is the case, for example, in English patent GB 2 382 907 relating to a system for the individual control of access to an airport comprising a card containing information such as, for example, biometric characteristics which could be read by an access control machine which compares them to information taken in real time on the user in order to authorise (or not) access to the user. The access card can moreover comprise, the characteristics of the status of the user (passenger, employee, hierarchical level), which determines the places of which access is authorised within the airport.

However, the current configuration of boarding places in a transport means, in particular of the aeroplane type, is such that the places where an access control is necessary are remote from one another, disseminated within the same global space destined for boarding; this multiplicity of control places consequently multiplies the risks of intrusion of unauthorised persons accessing there, or which would risk damaging the security of those persons on the transport, namely passengers, and administrative, technical and flight personnel.

SUMMARY

The aim of the present invention is to propose a secure airport terminal of which the technical and operational infrastructure makes it possible, on the one hand, to ensure a maximum security level to protect the physical integrity of the building constituting said terminal, aircraft, land vehicles, and passengers and flight, technical and administrative personnel, and, on the other hand, to propose secure parking and aircraft preparation zones in view of making the aircraft operational for a new departure. Moreover, to the security ensured by said infrastructure, is also added the notion of person confidentiality (passengers, crew, clients, etc.), aircraft, personal vehicles and movements associated with these 3 categories.

According to the invention, a secure terminal is therefore proposed for the aerial transport of passengers, of which the technical and operational infrastructure makes it possible to ensure the physical security of the building, aircraft, goods, passengers and flight, technical and administrative personnel and confidentiality of passengers and their goods, said secure terminal being noteworthy in that it comprises at least one building having a globally V-shaped horizontal section and comprising two branches extending from a mid-zone, constituting parking hangars for aircraft and determining between them an uncovered central zone, called "ramp", arranged to make it possible for the handling and parking of aircraft, the ramp being physically isolated from the exterior environment of the terminal secured by a barrier, named "shield", joining the free ends of the branches and thus transforming the building/ramp assembly into a secure enclosure, the shield also participating in safeguarding the confidentiality of boarding, disembarking and loading, unloading movements of the aircraft parked on the ramp.

The portion of the ramp arranged in the immediate proximity of the mid-zone is preferably covered and constitutes the boarding zone likely to receive at least one aircraft and making it possible for the boarding/disembarking of passengers, crew and clients and the loading/unloading of goods and loads out of bad weather or sunshine and in particular, out of invasive outside views.

Said portion of the ramp advantageously comprises a rotating platform capable of receiving an aircraft and of making it pivot by around 180 degrees to position the cockpit in the direction of the shield. In addition, the internal façade of the boarding zone is reinforced to resist the mechanical and thermal stresses caused by the thrust of said reactors of an aircraft.

Advantageously, the secure terminal comprises an autonomous or semi-autonomous defrosting device making it possible for the defrosting and application of defrosting products on aircraft located on the ramp, in order to make them operational for a new departure, said defrosting device being directly controllable by a worker on the ground or directly by the pilot in command of the aircraft in question.

According to a preferred embodiment, the defrosting device is a stabilised, suspended system composed of a distribution tank equipped with one or more buses, mobile along a cable tense between the branches of the building of the secure terminal, said distribution tank/cable assembly being mobile, along a direction substantially perpendicular to said cable using two winding trolleys, each capable of being moved along the upper edge of one of the internal façades of the branches of the building.

The distribution tank is preferably capable of being moved vertically with respect to the cable using an extendible device.

To ensure the security, the secure terminal is organised into zones of different security levels, the latter being at least as follows:
- HC ZONE: zones relating to placements outside of the control of the secure terminal,
- SCi ZONES: zones relating to placements outside and/or inside of the secure terminal under the control of said secure terminal,
- FO ZONE: zones relating to placements reserved for law enforcement agencies and not accessible to passengers, during the passage from one zone to another, specific security rules will be applied according to the entity which transits, said security rules being implemented by different means and equipment.

The secure terminal advantageously comprises a CCTV system to make it possible to monitor all of the SCi zones, the images produced by said video surveillance system being stored on the secure servers of said video surveillance system and transmitted in real time to a security control station (CS) of the secure terminal with secure and controlled access, said images transmitted to the CS being with an automatic masking of faces other than those of employees of the secure terminal.

Said video surveillance system preferably comprises fixed cameras and panoramic cameras, said cameras being high-definition cameras and using the Internet protocol to transmit, in an encrypted manner, images and control signals to video servers through a dedicated optical fibre or analogue internal communication network.

The video surveillance system furthermore has a system for detecting movement and facial recognition and a thermal camera network.

Preferably, the secure terminal comprises configurable transit shields at the level of the passage of one SCi zone to another, and several X-ray scanners used at least as follows:
  a scanner dedicated to checked-in luggage and placed at the level of the shield of vehicle arrivals;
  a scanner made available to law enforcement agencies at the level of the main access to aircraft, whether for arrivals or departures;
  a scanner dedicated to hand luggage and placed at the level of the shield of pedestrian arrivals;
  a scanner dedicated to goods, both for passengers and for the terminal;
  a scanner dedicated to the entry of personnel with metal detection gate.

In addition, the secure terminal advantageously comprises a system for managing containers making it possible to route, in secure containers, goods and/or luggage, in order to guarantee the integrity of the content thereof from the departure point thereof to the arrival point thereof, these secure containers having an electronic lock functioning based on codes with at least six figures needing to be entered on the keypad of the container(s), a unique closing code and a unique opening code being associated with each flight of an aircraft, such that once a container is closed, it can no longer be opened and, once opened, it can no longer be closed, except for express request from the authorities.

The secure terminal is preferably configured to guarantee the security linked to the personnel thereof, the latter being ensured by at least the following equipment and procedures:
  a specific recruitment procedure;
  an access lock for the entry of personnel with systematic passage through security gates;
  a biometric authentication for controlling access to workspaces;
  a limitation of personal items which could be present in the internal zones of the secure terminal;
  a limitation of communication means with the exterior;
  a unique secure and personalised badge to each employee required for any movement in the secure terminal.

Preferably, said badge is activated by inserting a unique secure and personalised chip card and the entering by the employee of their personal identification code, said chip card only being able to be programmed in the presence of the Human Resources Director and the Security Director of the secure terminal and containing at least the following encrypted data:
  the digital images of the face (in colour, in black and white and in infrared) of the employee;
  the fingerprints of the fingers of both hands;
  the vein prints of both hands;
  the standard identity information of the employee: surname, forename, role, duration of employment contact at least.

Finally, to ensure the security of aircraft from the time when they are on the ramp, the secure terminal comprises non-intrusive security means which require no equipment inside or on the aircraft, these security means comprising at least one video surveillance device, a device for the perimetric detection and controlling of appliances used mainly in hangars and on the ramp.

BRIEF DESCRIPTION OF THE FIGURES

Other advantages and characteristics will best emerge from the following description of a method of executing a secure terminal according to the invention, in reference to the appended figures, wherein.

DETAILED DESCRIPTION

Figure 1:
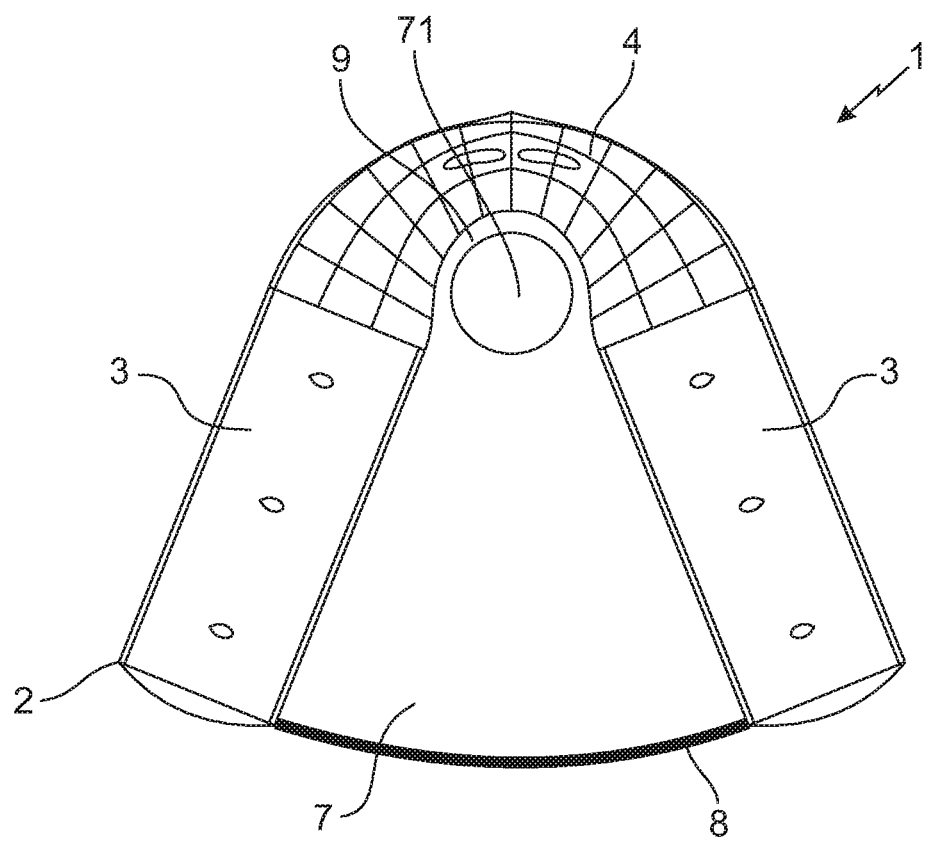
FIG. 1 is an exterior top view of a secure terminal according to the invention.
Figure 2:
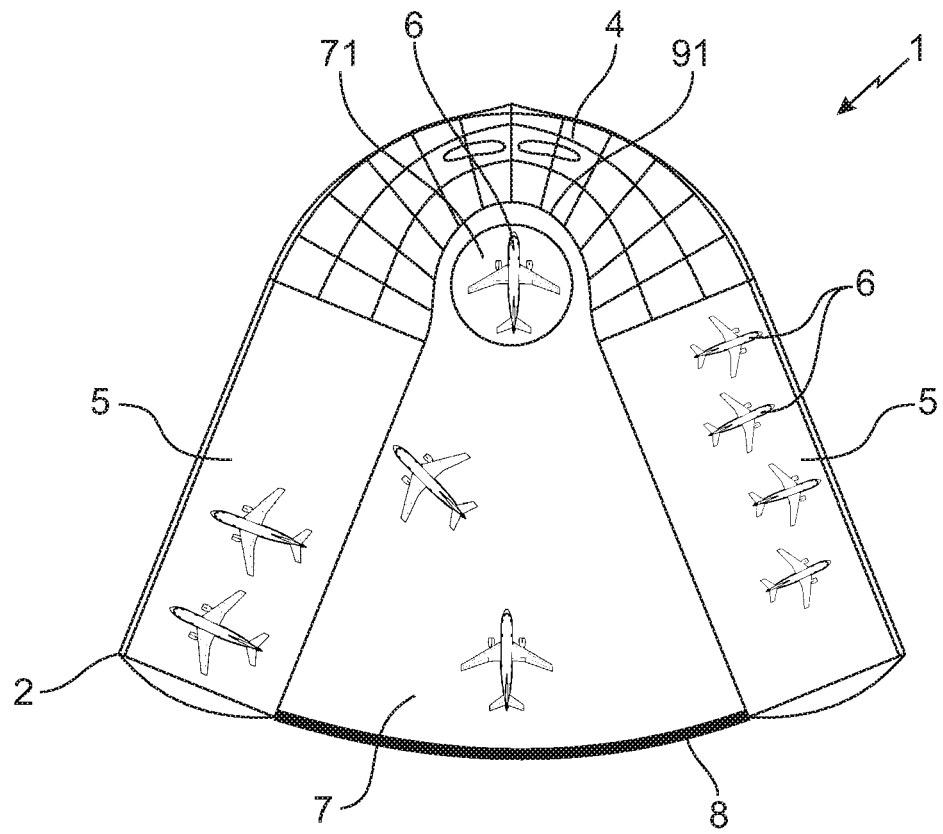
FIG. 2 is a partially interior top view of the secure terminal of FIG. 1.
Figure 3:
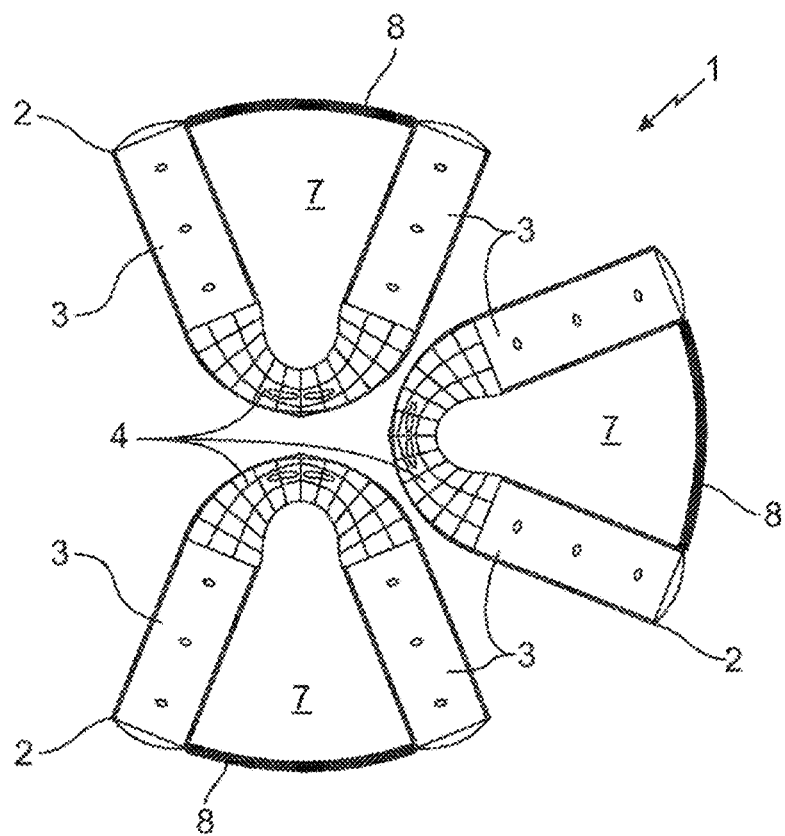
FIG. 3 is an exterior top view of a variant of the secure terminal of FIG. 1.

In reference to FIGS. 1 to 3, the invention relates to a secure terminal 1 for the aerial transport of passengers, mainly businesspersons, of which the technical and operational infrastructure makes it possible to ensure the physical security of the building, aircraft, passengers and flight, technical and administrative personnel.

Said secure terminal 1 comprises at least one building 2 having a globally V-shaped horizontal section and comprising two branches 3 extending from a mid-zone 4.

Each branch 3 constitutes parking hangars 5 for aircraft 6 making it possible to park the latter after a flight while awaiting a new departure or for upkeep or maintenance operations.

The two branches 3 of the building 2 determine between them, an uncovered central zone 7, called "ramp", which makes it possible for the handling, the operations and the parking of aircraft. The ramp 7 is physically isolated from the exterior environment of the secure terminal 1 by a barrier 8 of a significant height of several metres, named "shield", joining the free ends of the branches 3 and thus transforming the building 2/ramp 7 assembly into a truly secure enclosure. The shield 8 also participates in preserving the confidentiality of boarding, disembarking and loading, unloading movements of aircraft parked on the ramp 7.

Generally, the term "shield" here means a physical barrier (or not) having to be crossed by persons, equipment or goods/luggage to pass from one zone to another.

Said ramp 7 thus makes it possible to receive several aircraft 6 either to carry out passenger boarding/disembarking operations, or to make it possible for them to join the parking hangars 5. This configuration is particularly useful, as no aircraft, land vehicle, or individual can enter onto the ramp 7 without being authorised to do so.

Moreover, the portion of the ramp 7 arranged in the immediate proximity of the intersection of two branches 3 is covered and constitutes the boarding zone 9. In the latter likely to receive aircraft 6, passengers, crew and clients can board or disembark and goods and loads can be loaded/unloaded out of bad weather or sunshine and in particular, out of invasive outside views.

Moreover, to make it possible to also reduce the time necessary to make the aircraft 7 operational in view of a new departure, said portion of the ramp 7 comprises a rotating platform 71 capable of receiving an aircraft 6 and of making it pivot by around 180 degrees to position the cockpit in the direction of the shield 8. Likewise, to make it possible for said aircraft 6 to be moved by using the reactors thereof, the internal façade 91 of the boarding zone 9 will be reinforced to resist the mechanical and thermal stresses caused by the thrust of said reactors.

The secure terminal 1 advantageously comprises a car park for land vehicles integrated in the building 2, preferably on the ground floor of the latter. This architectural configuration is particularly useful, as it makes it possible to intrinsically guarantee the securing and the protection of said land vehicles, but also the confidentiality of arrivals and departures by land, as the rising and descending of vehicles are carried out even inside the building 2.

In addition, it is understood that the V-shape of the building 2 of the secure terminal 1 according to the invention ensures a perfect modularity of the latter. Indeed, this symmetrical geometric shape makes it possible, according to needs, for the adaptation of receiving surfaces and car parks (branches 3 and ramp 7). Likewise, this V-shape is particularly suitable for a multiplication of corolla-shaped buildings 2 (see FIG. 3).

Figure 4:
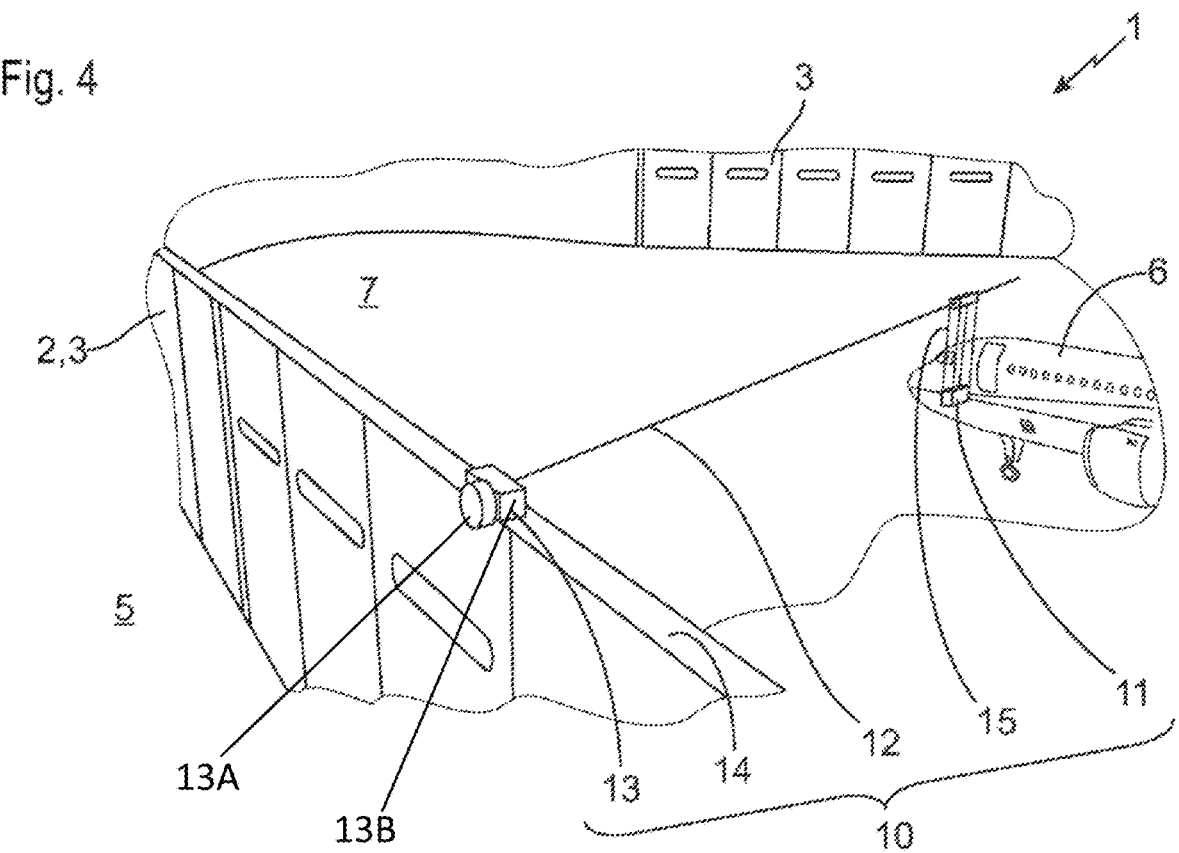
FIG. 4 is a perspective, partially top view of the secure terminal of FIG. 1.
Figure 5:
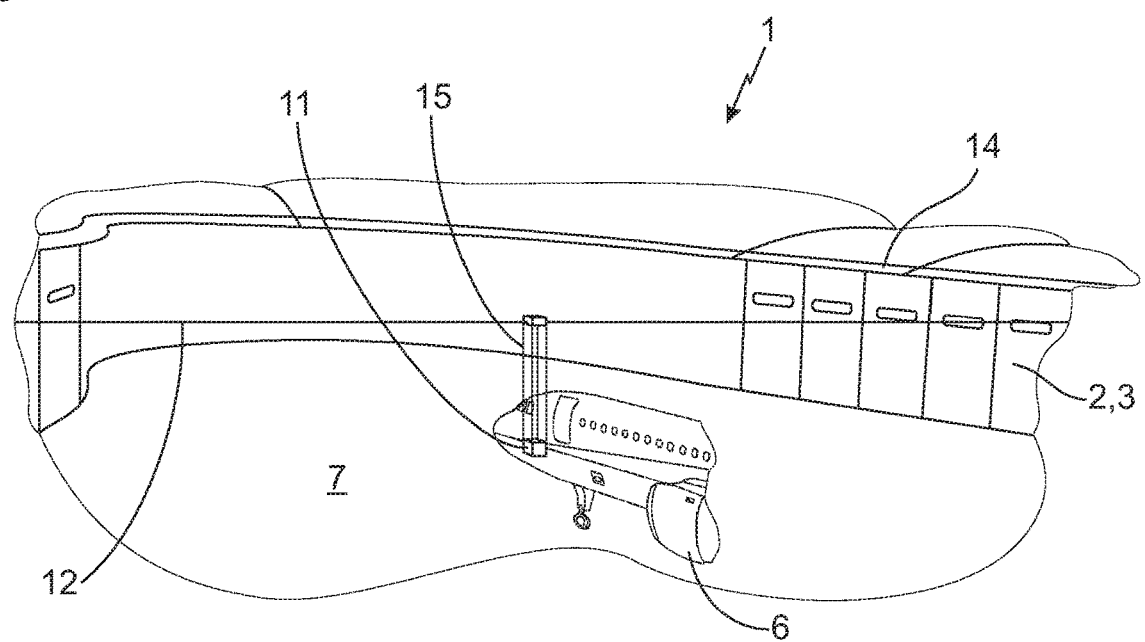
FIG. 5 is a perspective, partially top view of the secure terminal of FIG. 1 according to another viewpoint.

In reference to FIGS. 4 and 5, in order to guarantee the utilisation in total security of aircraft 6 in winter periods or in geographical zones with a harsh climate, the secure terminal 1 advantageously comprises an autonomous or semi-autonomous defrosting device 10, of which the aim is to make it possible to defrost and apply defrosting products on aircraft 6 located on the ramp 7 in order to make them operational for a new departure. Said defrosting device 10 is directly controllable by a limited worker on the ground, or directly by the pilot in command of the aircraft 6 in question.

Furthermore, the defrosting device 10 makes it possible for a diffusion of defrosting or anti-frost product in a quantity that is just required, suitable for the geometry of the aircraft 6 to be treated and for the analysis of icy surfaces or to protect them.

According to an embodiment represented in FIGS. 4 and 5, the defrosting device 10 is a stabilised, suspended system composed of a distribution tank 11, mobile along a cable 12 tense between the branches 3 of the building 2 of the secure terminal 1. Said distribution tank 11 (cable 12) is mobile, along a direction substantially perpendicular to said cable 12, using two winding trolleys 13, each capable of being moved, according to a slide connection or sliding pivot, along the upper edge of one of the internal façades of the branches 3 of the building 2.

Here, by "internal", this means an element, for example, a façade, which is located on the side of the ramp 7 and by "external", an element which is located on the opposite side.

Said distribution tank 11 is an electromechanical device containing a defined volume of defrosting and anti-frost products for one or more aircraft. These products are delivered onto the surfaces of the aircraft to be treated using one or more buses, not represented in the figures, arranged at the final points of the circuits of managed products, conventionally, by solenoid valves and pumps not represented.

The winding trolleys 13 are mobile along the branches 3 of the building 2 and comprise, for this purpose, one or more wheels 13a or rollers engaging with a guide rail 14 secured to the upper edge of the internal façade of the associated branch 3. Furthermore, each winding trolley 13 comprises a motorised hoist 13b, of the winch/winding hoist type, making it possible to wind the cable 12 symmetrically in order to adapt the actual length of said cable 12 to the geometry of the building 2 and to maintain, by resistant locking, the tension required in said cable 12. The supply of winding trolleys 13 is advantageously provided by a brush-commutator assembly installed jointly on each winding trolley 13 and on the associated guide rail 14.

Thus, with such a configuration, the distribution tank 11 is mobile according to at least two degrees of freedom in order to guarantee the projection of products over all the surfaces of the aircraft to be treated. The first degree of freedom, referenced X in FIG. 4, is ensured by the movement of the distribution tank 11 along the cable 12. The second degree of freedom, referenced Y in FIG. 4, is provided by the movement of the cable 12 along the guide rails 14 using the movements of each of the motorised trolleys 13.

The distribution tank 11 is preferably autonomous in electrical power by embedding one or more interchangeable batteries and with semi-rapid recharging, for example, of the Li-ion/Li—Po/Li—Fe at 1.5-2C maximum.

In addition, in order to ensure a precision of the treatment operations against frost and to reduce losses of chemical melting products (defrosting agents) and preventative products (anti-frost agents), a third degree of freedom, along a vertical direction referenced Z in FIG. 4, is provided. Thus, the distribution tank 11 is capable of being moved vertically with respect to the cable 12 using an extendible device 15 composed of pulley-cable assemblies or actuators. The latter degree of freedom also makes it possible for a placing on the ground of the distribution tank 11 for reloading products and changing batteries.

The defrosting device 10 is dedicated to the treatment of all aircraft 6 taken care of by the secure terminal 1, said aircraft 6 going from the small private jet, such as for example a Cessna Citation Mustang, to the medium-haul of the type, for example, Boeing 737 or Airbus 320. Consequently, it is understood that all the surfaces cannot be directly covered with defrosting or anti-frosting products by gravity. The distribution tank 11 is therefore equipped with one or more orientable buses, making it possible for a projection of products on surfaces that are difficult to access.

The defrosting device 10 is advantageously remote-controlled by a worker (operator on the ground or technical flight personnel, a pilot for example, directly from the cockpit of the aircraft 6) either in manual mode, or more usefully, in automated mode. In the latter mode, all that will be needed, is for the worker to enter into the interface, the coordinates in the space of the aircraft 6 to be treated, the physical position of the appliance in the treatment zone and the type of aircraft 6, before triggering the launching order of the defrosting procedure. However, in needed, the worker can trigger controlling the return to fill the distribution tank 11 or trigger the emergency stop.

In order to guarantee the precision and the controlling of the operations carried out, the distribution tank 11 is preferably equipped with a camera, not represented, transmitting in real time, the operations and the treated surfaces to the worker. This optional equipment goes in the direction of quality, but also in the direction of efficiency in terms of qualified labour required and time to reactivate the aircraft 6.

The whole interest of this defrosting device 10 according to the invention is understood. First, from an economic standpoint, the "closest" treatment of the surfaces according to the relative specific coordinates of the aircraft 6 makes it possible to avoid any over-wasting of defrosting or anti-frost products. Finally, the implementation of the defrosting device 10 is rapid and requires reduced labour for treatment and control operations.

The other aim of the secure terminal 1 is to ensure the physical security of the building, passengers and personnel. For this, the infrastructure of the secure terminal 1 is composed of robust and proven hardware and software, but also, specifically developed hardware and software.

Moreover, to guarantee the security of the secure terminal 1, the latter is organised in zones of different security levels, advantageously 6 of the latter, not represented in the figures:

HC ZONE: zones relating to placements outside of the control of the secure terminal 1 (public zones or runways), SC1 ZONE: zones relating to placements outside under the control of the secure terminal 1 (car parks, road, etc.), SC2 ZONE: zones relating to placements inside the secure terminal 1 and reserved for members of personnel to which any external person (visitors, passengers, etc.) has no access, SC3 ZONE: zones relating to placements inside the secure terminal 1 by which passengers transit (reception, lounges, open spaces, etc.), these zones being separated into two segments: national zone and international zone, SC4 ZONE: zones relating to placements inside for managing aircraft, these zones being protected by one-way doors configured dynamically according to the specific flow to each flight, FO ZONE: zones relating to placements reserved to law enforcement agencies and not accessible to passengers.

It is understood, that to pass from one zone to another, specific security rules will be applied according to the entity which transits (personnel, passengers, law enforcement agencies, etc.), said security rules being implemented by different means and equipment, not represented, and detailed below.

More generally, the SCi zones: SC1, SC2, SC3, etc. are zones relating to placements outside and/or inside the secure terminal 1 under the control of the latter.

Thus, to make it possible for a monitoring of all of the SCi zones (HC and FO zones not being covered for legal reasons), a CCTV system, advantageously high-definition, is implemented in the secure terminal 1.

Said video surveillance system preferably comprises fixed cameras and panoramic cameras to monitor zones with a broad spectrum (aircraft space, open space, etc.). These cameras are advantageously of the IP camera type, i.e. a camera using the Internet protocol to transmit images and control signals via a rapid connection of the Ethernet type, and preferably have at least the following characteristics: generation of High-Definition flow (1080P) at 30 images per second, optical zoom ×5 only requiring a luminosity level of 0.3 LUX.

Communications between said cameras and video servers are encrypted using a protocol for securing exchanges, of the Transport Layer Security type (TLS) or similar, each camera thus having its own identification key. Said communications are achieved through a dedicated internal communication network and transit by optical fibre or equivalent in order to remove any risk of electromagnetic interception.

Moreover, the images produced by the cameras of the video surveillance system are transmitted in real time to the security control station (CS) of the secure terminal 1 with secure access and control located preferably in an SC2 zone.

The cameras are preferably placed in tinted or clear glass domes to avoid any circumvention or analysis of the functioning thereof.

Said video surveillance system also comprises an internal technical infrastructure located in the SC2 zone and with secure and controlled access and equipped with IT servers making it possible to store all of the videos for a minimum duration of 2 years.

The video surveillance system furthermore has a system for detecting movement and facial recognition making it possible to trigger an alarm in case, for example, of not respecting the zones such that, for example, an unknown person being detected in the SC2 zone.

To complete the video surveillance system, a network of thermal cameras, not represented in the figures, is advantageously implemented in the different zones. Thus, in the N1 zone, these thermal cameras make it possible for the detection of movements over non-illuminated placements or not benefiting from a sufficient luminosity during the night. Likewise, in the SC2 and SC3 zone, these thermal cameras are used at the level of access to the terminal (SC2 for employees, SC3 for passengers) to non-intrusively detect any equipment which could be dissimulated in vehicles or clothes.

According to a preferred configuration, said thermal cameras have a range of 150 metres, diffuse a video stream at least of VGA quality at 30 images per second secured by the TLS protocol and have a level of sensitivity of less than 70 mK.

Moreover, the secure terminal 1 according to the invention is also equipped with several X-ray scanners used as follows:

a scanner dedicated to checked-in luggage and placed at the level of the shield of vehicle arrivals;

a scanner made available to law enforcement agencies at the level of the main access to aircraft, whether for arrivals or departures;

a scanner dedicated to hand luggage and placed at the level of the shield of pedestrian arrivals;

a scanner dedicated to goods, both for passengers and for the terminal;

a scanner dedicated to the entry of personnel with metal detection gate.

Ultrasound technology is also used within the secure terminal 1 according to the invention for monitoring aircraft, it will be detailed above.

Finally, the secure terminal 1 also comprises transit shields at the level of the passage from the N1 zone to the SC3 zone, the latter being configurable, defined and adapted according to needs: real time and/or planning.

With such a configuration, the security of passengers is mainly ensured by all equipment of the secure terminal 1 described above and used to ensure the security of the terminal, but also by a set of operational processes.

Thus, access to the internal zones of the secure terminal 1 (SC2 to SC4) is only authorised after the passage by a shield wherein a certain number of verifications are made. These actions make it possible to guarantee the security of other passengers but also members of the personnel.

Eligibility of the passenger;
Passage under X-ray of checked-in luggage;
Passage under X-ray of hand luggage;
Passage under infrared of the passenger.

To guarantee the security of goods within the secure terminal 1, a system for managing containers is provided, making it possible, in particular, to route, into secure containers, not only goods, but also checked-in luggage, in order to guarantee the integrity of the content thereof from the departure point thereof to the arrival point thereof, these secure containers having an electronic lock functioning based on a code with at least six figures which must be entered on the keypad of the container(s).

Thus, to each flight of an aircraft 6, is associated a unique closing code and a unique opening code according to the following method:

- at the time of the departure, the system for managing containers generates two unique codes: a closing code which is transmitted to the member of the personnel responsible for checked-in luggage (and possibly for the member of the personnel responsible for goods if processed in a different flow) and an opening code automatically printed on a delivery slip which is given to a member of flight personnel or to the pilot by a member of reception personnel;
- on arrival, the system for managing containers generates two unique codes: a closing code printed automatically on a handling slip given to a member of flight personnel or to the pilot by a member of reception personnel and an opening code which is transmitted to the member of personnel responsible for the transport of goods.

Once the container is closed, it can no longer be opened and, once opened, it can no longer be closed. In case of goods being omitted, a new container must compulsorily be provided, no failover code being possible.

However, if necessary, it is possible to generate a second opening code and to transmit it, only on request of the authorities, if these want to carry out verifications of goods contained in a container. This code is only valid one single time, the locking is automatic after the closing of verified goods.

The device for generating codes associated with the system for managing containers is based on the three following technologies:

- known SIM/SAM technology making it possible for the integration of a unique electronic chip in each container (SIM: Subscriber Identity Module) and the use of a unique generator on the servers (SAM: Secure Access Module), all of the cryptographic calculations being made within the microprocessors contained in said chips, no security key therefore being exposed;
- key diversification technology using block encryption algorithms according to a Feistel network;
- a code calculation protocol based on OTP technology (One Time Password).

Outside of physical security, the anonymity of passengers forms an integral part of the concept of the secure terminal 1 according to the invention. This anonymity of passengers, which is protected by the implementation of the shield 8 joining the free ends of the branches 3 of the building 2, is also possible using the technical and organisational methods implemented.

First, video surveillance images are fully recorded on secure servers of the video surveillance system, but are restored on the control screens of the security CS with an automatic masking of faces based on facial recognition technology, based for example, on the "Eigenface" method which uses a set of specific vectors in order to resolve the problem of recognising the human face. Said masking is synchronised with the database relating to the employees of the secure terminal 1, such that all unknown faces, i.e. not listed in said database, are automatically masked. However, this masking method is only applied for zones beyond N1.

In addition, arrivals and departures are carried out by transit zones which are dedicated to each flight. Thus, the passengers of two flights cannot physically cross, except for in shared spaces of the client does not benefit from a private transit space, said private transit spaces making it possible for passengers to be isolated from other passengers from their vehicle to their aircraft.

Outside of these aspects, in order to guarantee passenger confidentiality, employees are not authorised to have their mobile telephone or personal camera beyond the SC2 zone. Communication equipment which is thus made available to employees, does not make it possible to make calls outside or to take photos.

The secure terminal 1 is also configured to guarantee the security linked to the personnel, the latter being ensured by the following equipment and procedures:

- a specific recruitment procedure;
- an access lock for the entry of personnel with systematic passage through security gates, advantageously X-rays and metal detectors;
- a biometric authentication for controlling access to workspaces;
- a limitation of personal items which could be present in the internal zones of the secure terminal;
- a limitation of communication means with the exterior;
- a unique secure and personalised badge to each employee required for any movement in the secure terminal 1.

In addition, in order to avoid any risk linked to the undesirable intrusion of potentially dangerous objects or products, at each arrival, employees are confined in a locker room having reinforced walls where they must leave any personnel item and dress in their professional uniform, except for administrative employees having a specific accreditation. Then, they must pass under a metal detection gate and can randomly form the subject of a control by analysis of dangerous product. Each employee has an electronic badge wherein they must insert their chipcard described below. This badge will make it possible for employees to be automatically recognised in different zones of the secure terminal 1 and to be authenticated without having to attach it on a reader. To access the terminal, the employees use a one-way access lock for one single passage which is dedicated to them. To enter, as to exit, they must present their chipcard on a reader and be authenticated with their fingerprint (N1 zone to SC2 zone). To pass from one zone to another, each employee must be identified via a biometric or facial authentication.

To this end, biometric print sensors used to authenticate the employees integrate numerous technologies to guarantee the non-falsification of a print such as:

- contactless optical reader;
- fake finger and human finger detection;
- joint integration of the vein network;
- native encryption of fingerprints;
- no local storage of prints.

In addition, the prints are not stored in a central system, but in the chipcards of employees. Furthermore, the correspondence is made twice, once on the chipcard of the employee and once on the reader. This approach makes it possible to use two different trusted third parties.

To be able to be identified within the secure terminal 1, each employee of the personnel preferably has at least:

- one secure personal chipcard;
- one electronic badge to keep it on them;
- an internal communication means, if necessary;
- a digital tablet in order to be able to access the information system.

Said chipcard provided to each employee responds to the EAL security certification (Evaluation Assurance Level), level 5+ at least. The enrolment thereof is very secure, since once delivered, this personal chipcard cannot be modified. Said chipcard contains at least the following encrypted data:
- digital images of the face (colour, black and white and infrared) of the employee;
- the fingerprints of the fingers of the two hands;
- the vein print of the two hands;
- the standard identity information of the employee: surname, forename, role, duration of employment contact at least.

The chipcard can only be programmed in the presence of the Human Resources Director and the Security Director of the secure terminal 1. The chipcard of these two persons has a specific profile since each of them contains a third of the encryption key necessary for the enrolment of cards of other employees. Thus, secrets are distributed over different supports and are not held by any single system or person. To access these keys, the holder must be identified by their fingerprint.

To communicate with the contactless reader or the biometric reader, the chipcard establishes a secure communication channel avoiding attacks by listening to flows. To do this, the chipcard uses SIM/SAM technology, itself being comprised of SIM and each item of authentication equipment having a SAM.

The electronic badge is obligatory for each employee. It integrates the unique SIM/SAM security mechanism and is composed:
- of a placement for the chipcard (SIM);
- of a security component (SAM);
- of an electronic ink touchscreen displaying a numeric keypad before activation and the surname, forename, role of the employee after activation;
- of a long-range RFID (Radio Frequency Identification) radio frequency interface;
- of a wireless communication interface of the Bluetooth Low Energy (BLE) 4.2 type or similar.

To activate the badge, the employee must insert their chipcard in the badge and enter their personal identification code PIN (Personal Identification Number). For clear security reasons, at the end of 3 erroneous PIN codes, the card will be definitively blocked and a new card must be created.

Each badge has a transponder making it possible to localise it at any time in the secure terminal 1, but also to remotely block it. Each employee, according to their role, is authorised to access certain zones only, if the latter is detected in an unauthorised zone, an alert is emitted to the security CS and their accreditations will thus be temporarily blocked.

The badge is not authorised to exit the secure terminal 1. Consequently, if it is activated outside of the normal zone of use thereof or without a valid employee card, all of the data that it contains are automatically destroyed to avoid any "reverse engineering": activity consisting of studying an object to determine the internal functioning thereof or the production method and the secrets thereof.

With personal telephones not being authorised inside the secure terminal 1, employees have secure and restricted communication means making it possible for them to only communicate with the other members of the personnel or possibly the authorities.

Thus, several secure communication means are made available to the personnel: telephone, smartphone, or also, Walkie-Talkie.

Each of these communication means is associated with an employee. It is unlocked by a personal code, but also by the presence in the near field, of their badge, which must be activated.

Moreover, these communication means make it possible for access to the platforms for managing the secure terminal 1 and have several security mechanisms.

Thus, the communication means are unlocked automatically if the holding employee moves away or if the badge of said employee is deactivated (battery problem, removal of the card, etc.). Likewise, the communication means are automatically blocked, localised and their data deleted if it is illuminated outside of the geographical functioning zone thereof.

Furthermore, the secure terminal 1 ensures the security of aircraft 6 from the time when they are in the SC4 zone, i.e. in the hangars 5 or on the ramp 7. This security is ensured by several security means which are non-intrusive and require no equipment inside or on the appliance. These security means of aircraft 6 comprise at least one video surveillance device, a perimeter detection device and the control of appliances used over the SC4 zone.

The video surveillance device makes it possible to cover each aircraft, or group of aircraft by, on the one hand, a monitoring of it all using panoramic camera and, on the other hand, a local monitoring by cameras oriented specifically on specific placements such as, for example, access gates, check-in, etc.

From the time when an aircraft 6 is entered into the SC4 zone of the secure terminal 1, it thus has one of the following statuses:
- in movement: the aircraft 6 is in the SC4 zone of the secure terminal 1, it is thus identified by the serial number thereof which is recorded as "authorised" until the departure thereof;
- parked, in activity: only the movement of the aircraft 6 triggers an alert;
- parked, isolated: all the movements of the aircraft 6 itself, but also in the proximity, triggers an alert.

In all scenarios, if the video surveillance device is no longer able to localise the aircraft 6, for example by using optical recognition based on the serial number thereof, an alert is sent.

The secure terminal is equipped with a perimeter detection device, fixed or mobile, specifically designed. The latter makes it possible to cover and to manage all types of detections not covered by the video surveillance device described above.

Each perimeter detection device preferably comprises at least four entities, each having at least one emitter and an orientable laser beam receiver, two miniature directional cameras, a directional infrared emitter, a directional ultrasound emitter, a wireless connection to the supervision system and a manual or autonomous manual configuration system.

For each aircraft 6 of group of aircraft 6, the four entities are placed around the zone to be monitored and connected to one another to create one single and unique perimeter detection logical entity.

An alert is thus triggered if at least one of the following events is produced:
- the laser beam connecting the entities to one another is broken;
- one of the cameras observes a movement over the specific placement that it targets;
- the infrared system detects a mass;
- the ultrasound system detects a resonance change.

For basic aircraft 6, the perimeter detection device is positioned directly in the ground of the secure terminal 1, for the other aircraft 6, it is mobile and comprises removable feet.

The perimeter detection device can be activated and deactivated by members of the personnel of the secure terminal 1 authorised to work on the aircraft 6, only if an intervention order has been notified.

The secure terminal 1 is furthermore equipped with heavy equipment such as, for example, towing vehicles or escalators. The latter are all equipped with an electronic start system controlled by the badge of the employee and also using SIM/SAM technology. Said badge thus plays the role of SIM and the SAM module is integrated into each item of heavy equipment. Moreover, access to said items of heavy equipment is only authorised for employees having the required qualification. To start each item of heavy equipment, the employee must furthermore achieve a biometric authentication. This authentication will remain valid if the employee remains at a reasonable distance from said equipment, in the case on the contrary, to be able to restart the equipment, the employee must again be authenticated. In any case, the movement of said heavy equipment is only authorised if the authenticated employee is actually located on board.

To guarantee the security of the communication protocols, the secure terminal 1 advantageously uses contactless communication by radio frequency, RFID, the latter preferably using the 13.56 Megahertz frequency band. However, like any contactless radio communication, a person with a bad intention can listen to these communications using specialised equipment. It is therefore essential to resolve the security problem intrinsically linked to this type of communication. For this, all communications between the chips and the readers are advantageously conform with the GlobalPlatform Card Specification 2.2.1. standard and to the amendments thereof for the establishment of a secure SCP11-type channel (Secure Communication Protocol).

The complementary integration of a mutual authentication mechanism (SIM/SAM) guarantees not only the security, but also the integrity of the data exchanged.

Likewise, the secure terminal 1 advantageously uses, for communications between the badges and the peripherals, the communication protocol by radio frequency BLE 4.2 using the 2.4 Gigahertz frequency band, the latter being a communication protocol intended mainly to the objects connected for which the need despite data transmission being low and very economical regarding electric consumption. However, like any contactless protocol, it can be listened to by specialised equipment. To resolve the security problem intrinsically linked to the communication by radio frequency, all the communications between the badges and the peripherals are preferably encrypted by Elliptic Curve Cryptography (ECC), of the ECC256 type based on derived points specific to the secure terminal 1. In addition, to avoid spoofing of physical IDs, called MAC (Media Access Control) addresses, the badges implement the IRK (Identity Resolvable Key) protocol.

POSSIBILITY FOR INDUSTRIAL APPLICATION

The secure terminal 1 according to the invention is more specifically intended for the aerial transport for businesspersons, but it can also be considered for the aerial transport of conventional passengers or for land or sea transport.

Finally, it goes without saying, that examples of the secure terminal 1 according to the invention which has just been described are only specific illustrations, in no case limiting of the invention.

The invention claimed is:

1. A secure terminal for the aerial transport of passengers of a technical and operational infrastructure which makes it possible to ensure the physical security of the building, aircraft, goods, passengers and flight, technical and administrative personnel, and the confidentiality of passengers and their goods, said secure terminal comprising:
   at least one building having a horizontal V-shaped section, the horizontal V-shaped section comprising two branches extending from a mid-zone to a free-end, each branch comprising parking hangars for aircraft and
   an uncovered central zone between the two branches, called a "ramp", arranged to make it possible for the handling and parking of aircraft, the ramp being physically isolated from an exterior environment of the secure terminal by a barrier, named "shield",
   the shield joining the free ends of the branches thus forming a secure enclosure, the shield also participating in preserving the confidentiality of boarding, disembarking and loading, unloading movements of aircraft parked on the ramp.

2. The secure terminal according to claim 1, wherein the portion of the ramp arranged in the immediate proximity of the mid-zone is covered and constitutes the boarding zone likely to receive at least one aircraft and making it possible for the boarding/disembarking of passengers, crews and clients and the loading/unloading of goods and loads out of bad weather or sunshine and in particular, out of invasive outside views.

3. The secure terminal according to claim 2, wherein said portion of the ramp comprises a rotating platform configured to receive an aircraft and pivot by around 180 degrees to position the cockpit in the direction of the shield, wherein an internal façade of the boarding zone is reinforced to resist mechanical and thermal stresses caused by thrust of one or more reactors of an aircraft.

4. The secure terminal according to claim 1, further comprising an autonomous or semi-autonomous defrosting device for defrosting and applying defrosting products on the aircraft located on the ramp in order to make the operational for a new departure, said defrosting device being controllable directly by a worker or directly by a pilot in command of the aircraft.

5. The secure terminal according to claim 4, wherein the defrosting device is a stabilised suspended system composed of a distribution tank equipped with one or more buses, mobile along a cable tense between the branches of the building of the secure terminal, said distribution tank/cable assembly being mobile, along a direction substantially perpendicular to said cable using two winding trolleys configured to move along an upper edge of one of the internal façades of the branches of the building.

6. The secure terminal according to claim 5, wherein the distribution tank is capable of being moved vertically with respect to the cable using an extendible device.

* * * * *